May 24, 1966  K. T. KSIESKI  3,252,684
ROTARY SPHERICAL VALVE ASSEMBLY
INCLUDING FLUID PRESSURE SEALS
Filed May 18, 1962  2 Sheets-Sheet 1
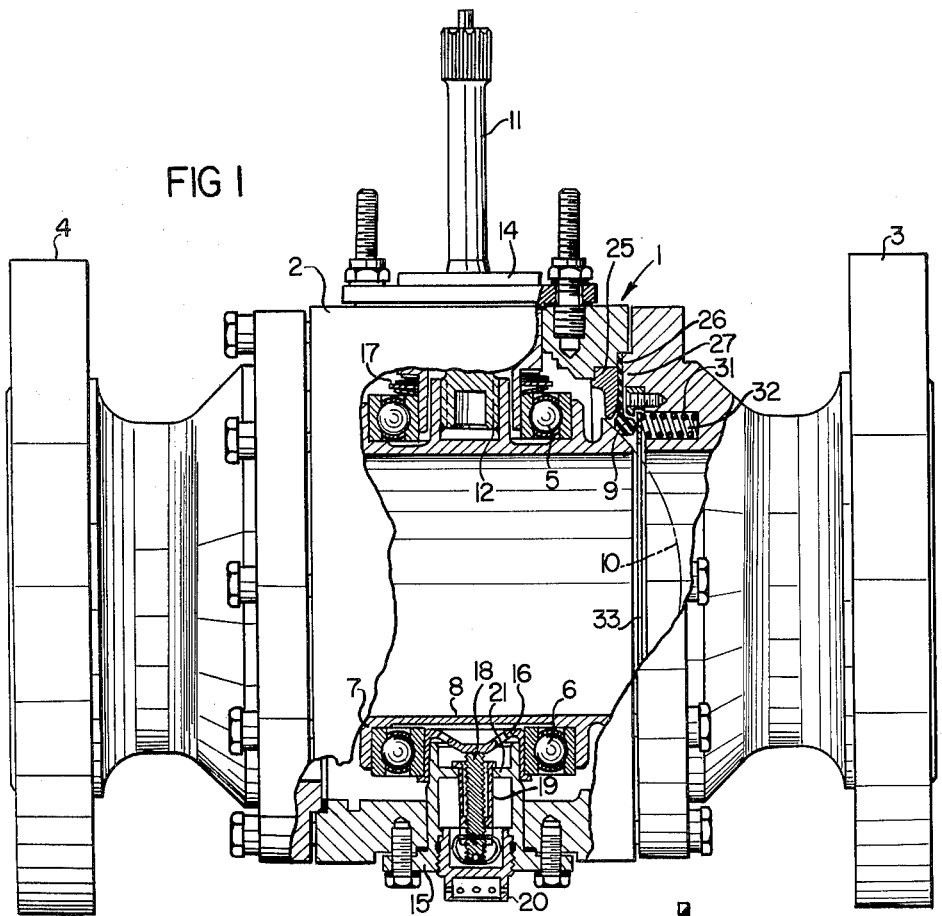
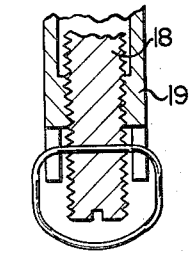
FIG 5
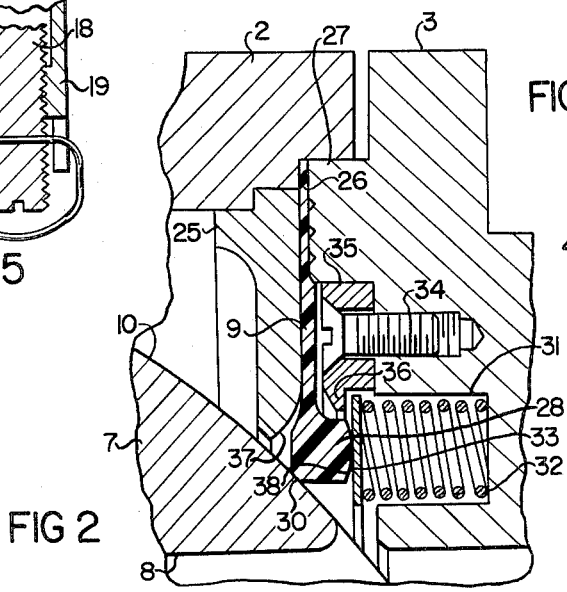
FIG 2
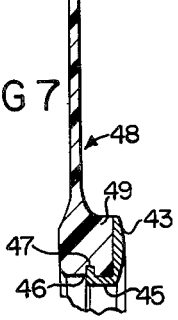
FIG 7
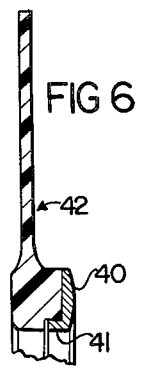
FIG 6
*INVENTOR.*
KAZIMIERZ T. KSIESKI
BY Oberlin, Maky & Donnelly
ATTORNEYS INVENTOR.
KAZIMIERZ T. KSIESKI
BY Oberlin, Maky & Donnelly
ATTORNEYS

United States Patent Office 3,252,684
Patented May 24, 1966

3,252,684
ROTARY SPHERICAL VALVE ASSEMBLY INCLUDING FLUID PRESSURE SEALS
Kazimierz T. Ksieski, Pacific Palisades, Calif., assignor to Parker-Hannifin Corporation, Cleveland, Ohio, a corporation of Ohio
Filed May 18, 1962, Ser. No. 195,842
10 Claims. (Cl. 251—172)

The present invention relates generally to a valve assembly and more particularly to a valve assembly of the type in which a movable valve member is sealed by a ring mounted within the valve body. Further, the invention may be used to advantage on valves having a rotary spherical valve member, or ball, and which valves are suitable for use at cryogenic temperatures.

In rotary ball valves of this type it is important that the seal ring have enough flexibility and "self-healing" properties to make up for imperfections in the spherical sealing surface and also to make up for uneven wear of the seal ring due to portions of the ring passing over the flow passage in the valve member. For cryogenic temperatures these properties are best supplied by fluorocarbon resins, such as the tetrafluoroethylene polymers known under the trademark names "Teflon" and "Kel-F". Even though these materials are suitable for operation at temperatures as low as −300° F., it is essential that seating force provided by springs or the like be properly distributed and controlled to minimize uneven wear and still provide sufficient force for flexing the seal to compensate for such imperfections and uneven wear. This is especially important in valves intended for use in connection with missiles and space craft where leakage in a valve is extremely critical.

With the above in mind it is an object of this invention to provide a highly efficient and reliable sealing arrangement for valves to be used at cryogenic temperatures.

It is another object to provide a sealing arrangement of the type described in which the seal ring has an effective area subject to fluid pressure so as to provide adequate seating force at low fluid pressures and wherein a means is provided for reducing the effective area at high fluid pressures so as to avoid excessive seating force.

It is another object to provide a sealing structure of the type described in which spring pressure is applied at spaced intervals about the circumference of the sealing ring in a manner so that the ring may flex only to a limited extent due to application of spring pressure at any point.

It is another object to provide a flexible member between the sealing ring and a series of spaced springs for seating the same wherein the flexible member distributes the load from each spring to a limited portion of the seal ring.

It is another object to provide a valve assembly having a rotary spherical valve member and a seal ring therefor in which there is an adjusting means for co-axial positioning of the valve member and seal, which adjusting means compensates for unequal thermal expansion and contraction of the materials of the valve assembly.

Other objects and advantages of the invention will be apparent from the description and from the drawings, in which;

FIG. 1 is a side elevation view, partly in cross-section, showing a valve with a spherical rotary valve member and a seal ring therefor in accordance with the present invention;

FIG. 2 is an enlarged cross-section view showing a portion of the seal ring of FIG. 1 as engaged with the spherical valve member when the latter is in open position;

FIG. 5 is a fragmentary view of a portion of an adjusting screw for positioning the valve member within the valve body.

FIGS. 6, 7 and 8 are cross-section views showing several modified forms of the invention.

Figure 8:
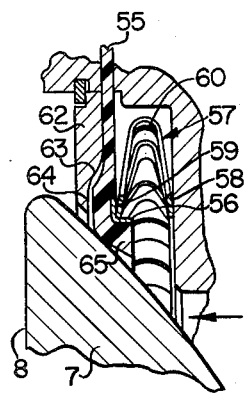

Referring now more particularly to the drawing, and first to FIG. 1 thereof, the valve assembly 1 herein shown by way of example, is a rotary spherical plug type valve assembly and comprises a body 2 to opposite sides of which are secured an inlet port adapter 3 and an outlet port adapter 4.

Journalled in said body as by the antifriction bearings 5 and 6, is a spherical valve member 7 which has a passage 8 therethrough for permitting flow of fluid through the valve assembly 1 when the valve member 7 is in the position shown in FIG. 1. When the valve member is turned 90° in either direction to the position shown in FIG. 3, the flow of fluid through the passage 8 is blocked by the engagement of seal ring 9 with the spherical outer surface 10 of the valve member. The valve member 7 is thus turned between valve opening and closing positions as by means of the stem 11 which has a splined connection 12 with the valve member.

The adapter 14 at the top of the body 2 is provided with a suitable packing assembly, not shown, to provide a fluid-tight seal with the rotary stem 11.

The bottom of the body 2 is provided with sleeve 15 which has a slide fit in bearing cup 16 to position bearing 6 coaxial with bearing 5 and thus fix the axis about which valve member 7 may be rotated.

Valve member 7 is resiliently urged downwardly by spring washers 17 interposed between top bearing 5 and stem packing adapter 14 so that bearing cup 16 engages the upper end of an adjusting screw 18 having threaded engagement at its lower end, as best seen in FIG. 5, with a bushing 19 mounted in sleeve 15 which is fixedly attached to body 2. As evident, by turning the adjusting screw 18 in bushing 19 spherical valve member 7 may be raised or lowered to position its horizontal center line with respect to the axial center line of seal ring 9 whereby spherical surface 10 of the valve member may seat properly on seal ring 9. Screw 18 is then wire locked through slots in bushing 19 and the opening in sleeve 15 is closed by a threaded and sealed plug 20.

The means just described for positioning valve member 7 also includes means for compensating for or minimizing the misaligning effect brought about by differential expansion and contraction of the materials of the valve assembly due to temperature changes. Thus, in a valve assembly for cryogenic applications body 2 may be made of aluminum, sleeve 15 of stainless steel, bushing 19 of Invar, adjusting screw 18 of aluminum, and bearing cup 16 of stainless steel.

Assume that valve member 7 has been adjusted to its proper position at room temperatures and that the valve is subsequently exposed to a much lower temperature. As the temperature is lowered, the diameter of body 2 shrinks so that its bottom surface, against which sleeve 15 is clamped, moves up closer to the horizontal center line of the valve and carries adapter 15 with it. This tends to raise shoulder 21 on sleeve 15 upwardly an amount dependent upon the shrinkage of body 2. However, sleeve 15, which is of stainless steel and which has a coefficient of expansion less than that of aluminum, also shrinks. Since it is fixed at its lower end to the body, the shrinkage of sleeve 15 tends to lower the position of shoulder 21 and thus partially compensates for shrinkage of the body so that shoulder 21 is raised only a small amount dependent upon the difference in the expansion coefficient of the two metals and the dimensions of the parts.

At the same time, Invar bushing 19 retains practically its full length because of its extremely low coefficient of expansion. Bushing 19 has an outwardly turned flange at its upper end which provides a shoulder in engagement with shoulder 21 and hence bushing 19 is raised throughout its length about the same amount as shoulder 21. The lower end of the bushing is threadedly attached to adjusting screw 18 thus screw 18 is raised about the same amount as shoulder 21. Meanwhile, screw 18 has shrunk so that its shrinkage between its threaded connection to bushing 19 and its upper end is subtracted from the amount which its upper end would otherwise be lifted by bushing 19. The net result is that the upward movement of the upper end of adjusting screw 18 is less than it would be if bushing 19 were of a material having a larger coefficient of expansion and thus it more nearly matches the upward displacement of bearing cup 16 due to shrinkage of valve member 7 and of the rings of anti-friction bearings 5 and 6. The slide fit of the upper end of sleeve 15 within bearing cup 16 permits relative axial movement therebetween caused by adjustment of valve member 7 by screw 18 and by temperature changes.

Since, in the present case, the valve assembly is of the two-way type having only two positions, namely, "On" and "Off" only a single seal ring is required between the inlet port adapter 3 and the rotary valve member 7. The inlet side of valve body 2 is counterbored to receive a seal backup ring 25 and is further counterbored to receive the peripheral portion of radial flange 26 of seal ring 9 and the annular clamping rib 27 of the inlet port adapter 3.

Figure 3:
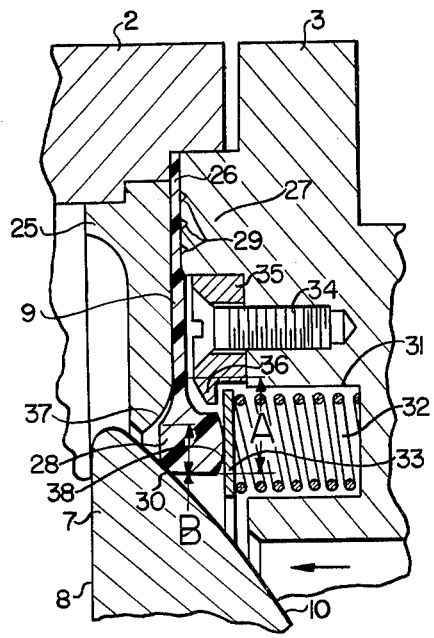
FIG. 3 is a cross-section view similar to FIG. 2 except showing the valve member in closed position.
Figure 4:
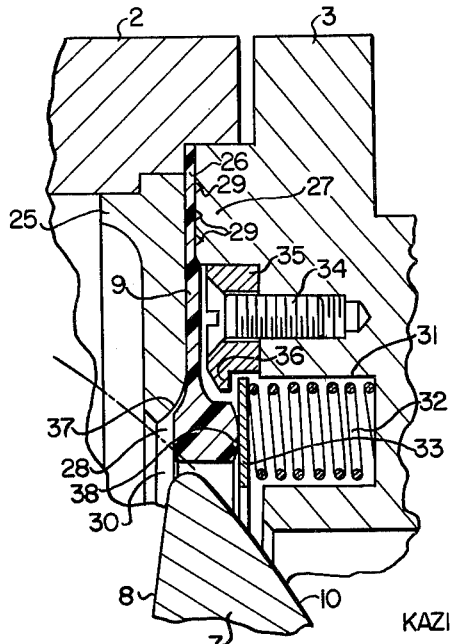
FIG. 4 is a cross-section view similar to FIG. 2 but showing the valve member in partially open position.

Seal ring 9, as best shown in FIGS. 2, 3, and 4, comprises a central axially thickened seat portion 28 and the integral flexible radial flange 26. Part of the thickened seat portion 28 projects axially beyond flange 26 in the form of an annular rib having a rounded outer surface. For use of the valve assembly 1 at cyrogenic temperatures, seal ring 9 is molded of a fluorocarbon resin such as Teflon or Kel-F, as mentioned above.

Because of its thickness, seating portion 28 is of limited flexibility. Flange 26 is thin and readily flexible. It has a peripheral portion firmly clamped between the body 2 and backup ring 25 and the clamping rib 27 of the inlet port adapter 3 and an unclamped intervening portion between the clamped peripheral portion and the thickened seat portion 28. The clamping rib 27 may be provided with concentric grooves 29 for displacement of the seal ring material and for establishing high unit pressure clamping areas.

The inner corner of seating portion 28 is formed with a narrow beveled seat 30 to engage the spherical surface 10 of valve member 7 so as to close off fluid flow through the valve assembly 1 when valve member 7 is turned to the FIG. 3 position. Because the flange 26 is of great radial width, seating portion 28 is held against radial shifting, but because of the axial thinness of the unclamped intervening portion of flange 26, seating portion 28 is capable of axial movement and a certain amount of tilting for finding its seat on valve member 7.

For pressing seating portion 28 against valve member 7, the inlet adapter 3 has a circular series of recesses 31 for example, thirty-two in number, in each of which is disposed a coil spring 32 or the like which, through the metal washer 33 urges seating portion 28 toward valve member 7 to establish fluid-tight engagement of seat 30 with surface 10.

Washer 33 is sufficiently flexible to permit it to assume a wavy or warped form in axial directions so as to correspondingly flex seat portion 28 under the action of springs 32 for maintaining the seal in uninterrupted contact with valve member 7 when the latter is in closed position, even though the valve member is not truly spherical or is slightly out of center.

Furthermore, the flexibility of washer 33 permits the seat ring to maintain leakproof contact with the ball even in case of a local or uneven wear of the seat portion 28. This self-sealing ability of the seal is particularly noticeable when the seal ring returns to environmental temperature after being locally worn while operating with cryogenic fluid. When the stiffness of the fluorocarbon is reduced at environmental temperature, the section of seat portion 28 which has been locally worn and lost contact with the valve member yields under pressure of the springs located directly above and the leakproof contact is reestablished. The semi-rigid washer 33 loaded by independent springs 32 follows the slightly distorted contour of the rear rib surface 38 and assures uniform pressure of seat portion 28 against the valve member.

On the other hand, washer 33 is rigid enough to distribute the load from any given spring 32 a limited distance along the circumference of seat portion 28 toward the adjacent springs so as to substantially uniformly distribute the spring load about the circumference of the seat portion.

When the valve member is in a partially open position a section of seat portion 28 is over flow passage 8 in the valve member and hence not supported by the valve member. Because the washer and seat portion 28 are flexible the unsupported section will flex a slight amount into flow passage 8 to dissipate the force of the springs located over such unsupported section and prevent the same from being transmitted to the supported section of seat portion 28. In this manner the unit pressure between the supported section of seat portion 28 and the valve member is not appreciably increased due to passage of the seat portion 28 over the flow passage in the plug and hence wear at such supported sections is not increased. Thus the flexibility of washer 33 and seat portion 28 are important factors which contribute to both the extremely low rate of wear of the seal ring and the minimizing of uneven wear.

The inlet adapter 3 has secured therein, as by screws 34, a spring retainer 35, the inturned lip 36 of which radially overlies a portion of the washer 33 to thus hold the spring assembly together to facilitate assembly and disassembly of the inlet adapter 3 from or to the body 2. Lip 36, by contacting washer 33, also serves to limit the distance springs 32 may move seating portion 28, or sections thereof, inwardly, as when valve member 7 is removed or when sections of the seal ring are passing over flow passage 8 in the valve member.

Another noteworthy feature of the present invention is the provision of the receding surface 37 on the backup ring 25. In cryogenic applications, seal ring 9 loses some of its elasticity and, therefore, it must be firmly pressed against valve member 7 in order to establish a fluid-tight seal. In the present case, the fluid pressure in the inlet adapter 3, when relatively low, acts on the relatively large unbacked area of radial width A of seal ring 9, tending to force seating portion 28 against plug surface 10 (see FIG. 3). However, as the fluid pressure in the inlet adapter 3 increases, it progressively forces seal ring 9 against the receding surface 37, thereby progressively decreasing the unbalanced area from radial width A to radial width B as seal ring 9 is deformed against said surface 37. Without such backup ring 25 operating in the manner aforesaid, the friction between seal ring 9 and valve member 7 would increase in substantially direct proportion to the increase in fluid pressure acting on a fixed area of seal ring 9. However, in the present case, the increasing fluid pressure acts on a decreasing area (radial width A to B) of seal ring 9 and thus the friction between seal ring 9 and valve member 7 increases at a progressively decreasing rate so that the final maximum friction is considerably less than it would be if the effective area were not decreased.

The aforesaid receding surface 37 of the backup ring also precludes excessive deformation of the seating portion 28 of seal ring 9 that is not backed up by valve member 7, as when the latter is being moved from open position to closed position, or vice versa, as represented by FIG. 4. Moreover, seating portion 28 has substantial axial rigidity to resist excessive deformation thereof by springs 32. Also, at that time, the pressure differential on opposite sides of seal ring 9 is generally not sufficient to force that portion of seal ring 9 to its maximum inward position as determined by surface 37.

As shown in FIG. 3, the inner margin of backup ring 25 is spaced from valve member 7 an amount less than the width of rib 28 so that there is no chance of fluid pressure forcing rib 28 between such inner margin and the valve member.

It is to be noted that the annular rear surface 38 of seat portion 28 is convexly curved so as to have a line contact with the spring backup washer 33 at a substantially constant diameter whether the sealing portion 28 is swung in or out due to seal deflection under pressure.

In cases where greater rigidity is desired in seat portion 28, a stiffener ring 40 of the type shown in FIG. 6 may be employed, said ring 40 having an axially extending flange 41 which substantially stiffens the seal 42 even though the stiffener ring 40 is relatively thin. The flange 41 also supports seat portion 28 against radial shrinkage at low temperatures.

In FIG. 7 the stiffener ring 43 has, in addition to the axial flange 45, a radial flange 46 which is interlocked in an internal groove 47 in seal 48 and supports thick seat portion 49 so that a section of the latter cannot be forced into flow passage 8 by high velocity fluid when the valve member approaches its closed position.

Figure 9:
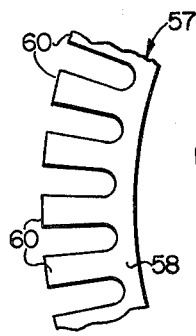
FIG. 9 is a fragmentary plan view of a modified form of spring means for the form shown in FIG. 8.

In the modification of FIGS. 8 and 9, seal ring 55 has an annular metal shell 56 fitted thereto and a different form of spring is used for applying seating pressure to the seal ring. In this instance a spring 57 is used which is annular with full circular bands 58, 59 joined to the ends of a plurality of spaced leaf sections 60. Lower band 59 bears against shell 56 to urge seal ring 55 toward valve member 7. Each of the spaced leaf sections 60 acts as an individual spring and transmits its force to only a short section of bands 58, 59. The latter are thin and flexible so that spring force at one circumferential section of the spring is not transmitted to a remote section. Likewise, shell 56 is thin and flexible so that force is transmitted to it by the spring at one circumferential section. In addition, shell 56 by receiving the thrust from band 59 prevents the latter from digging into the seal ring and thus avoids cold flow of the latter which might otherwise occur under a more concentrated load.

In the FIG. 8 form, which is more adaptable to small size valves where the available room at the inlet adapter is more limited, the backup washer 62 is also modified to place the receding surface 63 further away from valve member 7 to increase the overbalance area and to provide a horizontal shelf 64. The shelf serves as a positive support for sections of seat portion 65 when such sections pass over flow passage 8 in valve member 7 and are thus not supported by the valve member.

It can be seen that the present valve assembly, while employing a flexible seal ring 9 (also seals 42 or 48 or 55) having slidable engagement with a movable valve member, is efficient over a wide temperature and pressure range. The seal rings have a strong axially thickened seat portion 28 which is capable of being flexed axially into sealing engagement with the valve member 7 by reason of the thin radial flange 26 thereof. The seal rings are both spring-actuated and fluid pressure-actuated to make firm engagement with the valve member 7 but because of the increased resistance of the flange 26 to deformation, the decreased spring force on the seat portion 28 and the decreased area of fluid pressure unbalance on the seal ring, any added movement thereof toward the valve member 7 does not result in substantial increase in friction. Furthermore, the rigidity of seat portion 28 is such that when the passage 8 of the valve member uncovers a portion thereof, as in FIG. 4, that uncovered portion is not deformed excessively so as to be damaged or pinched between the edge of passage 8 and the backup ring 25. On the other hand, the seal rings have a moderate degree of flexibility so that under low fluid pressure conditions, the springs 32 will cause the seat 30 to engage the surface 10 despite out-of-roundness or deformation. It should also be mentioned that because the flange 26 has a relatively great radial width the seat 30 will remain truly circular at all times and cannot shift radially whereby said seat will effect a fluid-tight seal with surface 10.

I claim:

1. A valve assembly comprising a body member having inlet and outlet ports, a valve member movable in said body member to open and close fluid communication between said ports, a seal ring carried by one member for making fluid tight contact with the other member when said valve member is in a position closing such fluid communication, said seal ring having a seat portion, a peripheral portion by which said seal ring is clamped to said one member, and a laterally extending intervening portion interconnecting said seat portion and peripheral portion, said intervening portion being flexible so as to enable the seat portion to move axially into such fluid tight contact, a series of circumferentially spaced springs between said one member and said seat portion urging said seat portion into engagement with said other member, and a thin semi-rigid washer means between said springs and said seat portion, operative to limit the distribution of the load from each spring to confined adjacent sections of said seat portion.

2. The valve assembly of claim 1 in which said springs are in the form of leaf springs connected to thin, flexible circular bands, one at each end of the leaves.

3. A valve assembly comprising a body member having inlet and outlet ports, a valve member movable in said body member to open and close fluid communication between said ports, a seal ring carried by said body member for making fluid tight contact with said valve member when said valve member is in a position closing such fluid communication, said seal ring having a seat portion, a peripheral portion by which said seal ring is attached to said body member, and a laterally extending intervening portion interconnecting said seat portion and peripheral portion, said intervening portion being flexible so as to enable said seat portion to move axially into such fluid tight contact, said seat portion including an annular rib, said rib having an outer end face, a washer in engagement with said outer end face, spring means between said body member and said washer for urging the seat portion against said valve member, said outer face being rounded so as to maintain a line contact with said washer despite slight rocking movement of said seat portion.

4. A valve assembly comprising a body member having inlet and outlet ports, a valve member movable in said body member to open and close fluid communication between said ports, a seal ring carried by said body member for making fluid tight contact with said valve member when said valve member is in a position closing such fluid communication, said seal ring being in the form of an integral one piece resilient member having a seat portion, a peripheral portion by which said seal ring is attached to said body member, and a laterally extending intervening portion interconnecting said seat portion and peripheral portion, said intervening portion being flexible so as to enable said seat portion to move axially into such fluid tight contact, said seat portion including an annular rib engageable by a spring means for urging the seat portion into fluid tight engagement with said valve member, said rib extending axially of said intervening portion in a direction away from said valve member whereby contact of said spring means with said intervening portion is avoided.

5. A valve assembly comprising a body member having inlet and outlet ports, a valve member rotatable within said body member to open and close fluid communication between said ports, said valve member having a spherical sealing surface, a seal ring mounted in said body for making fluid tight contact with said spherical sealing surface when said valve member is in a position closing such fluid communication, a sleeve having one of its ends rigidly attached to said body member and extending into said body member toward one end of said valve member, said sleeve having a shoulder spaced inwardly of said rigidly attached end, a bushing having a shoulder at its inner end in engagement with said sleeve shoulder and extending toward said rigidly attached sleeve end, and an adjusting screw having threaded engagement with said bushing, said adjusting screw bearing against said valve member for adjusting the lateral position of said valve member relative to said sealing ring.

6. The valve assembly of claim 5 in which said bushing is of substantial length between said bushing shoulder and said threaded engagement and is made of a material having a substantially lower coefficient of expansion than said sleeve and body whereby temperature changes of said bushing have no appreciable effect upon the position of said valve member relative to said body member.

7. The valve assembly of claim 5 in which said valve member includes a cylindrical guide surface and the inner end of said sleeve has a close fit with said surface for fixing the axis of rotation of said valve member but permitting relative axial motion between said sleeve and valve member.

8. A valve assembly comprising a body member having inlet and outlet ports, a valve member movable in said body member to open and close fluid communication between said ports, a seal ring carried by said body member for making fluid tight contact with said valve member when said valve member is in a position closing such fluid communication, said seal ring having a seat portion, a peripheral portion by which said seal ring is attached to said body member, and a laterally extending intervening portion interconnecting said seat portion and peripheral portion, said intervening portion being flexible so as to enable said seat portion to move axially into such fluid tight contact, spring means for urging said seat portion into such fluid tight engagement, an annular washer between said spring means and said seat portion for transmitting the pressure of said spring means to said seat portion, said washer having a cylindrical flange for supporting said seat portion against radial shrinkage, and a semi-rigid washer between said annular washer and said spring means, said annular washer having a rounded surface for engaging in line contact with said semi-rigid washer.

9. A valve assembly comprising a body member having inlet and outlet ports, a spherical valve member movable in said body member to open and close fluid communication between said ports, a seal ring carried by one of said body and valve members for making fluid tight contact with the other of said body and valve members when said valve member is in a position closing such fluid communication, said seal ring having a seat portion, a peripheral portion by which said seal ring is clamped to said one member, and a laterally extending intervening portion interconnecting said seat portion and peripheral portion, said intervening portion being flexible so as to enable the seat portion to move axially into such fluid tight contact, a backup member rigidly mounted in said body member and having a first portion in engagement with a part of one side of said intervening portion to support the same against the pressure of fluid acting on the other side of said intervening portion and having a second portion spaced from said one side whereby only a part of the fluid pressure acting on the other side of the intervening portion is effective for urging said seat portion into such fluid tight contact, said second portion also underlying at least part of said seat portion and being engageable therewith for supporting the same against said fluid pressure upon flexing of said intervening portion by fluid pressure acting on said other side.

10. The valve assembly of claim 9 wherein said second portion is curved so as to increase the area of supporting engagement of said backup member with said intervening portion upon flexing of the latter toward said backup member by fluid pressure on said other side.

References Cited by the Examiner

UNITED STATES PATENTS

| | | | |
|---|---|---|---|
| 1,793,655 | 2/1931 | Vandeveer | 251—184 X |
| 2,191,232 | 2/1940 | Heinen | 251—174 |
| 2,194,541 | 3/1940 | Buttner | 251—335.1 X |
| 2,233,074 | 2/1941 | Corbin | 251—312 X |
| 2,341,692 | 2/1944 | Clade | 251—309 |
| 2,487,436 | 11/1949 | Goehring | 251—309 |
| 2,701,117 | 2/1955 | Bashark | 251—174 |
| 2,707,481 | 5/1955 | McPherson | 251—331 |
| 2,732,170 | 1/1956 | Shand | 251—172 |
| 2,799,470 | 5/1957 | Margrave | 251—172 |
| 2,837,308 | 6/1958 | Shand | 251—315 X |
| 2,853,269 | 9/1958 | Shand | 251—174 X |
| 2,893,430 | 7/1959 | Holl | 251—174 X |
| 2,930,575 | 3/1960 | Britton | 251—315 X |
| 2,963,261 | 12/1960 | Holl | 251—174 X |
| 3,076,631 | 2/1963 | Grove | 251—315 X |

FOREIGN PATENTS

| | | |
|---|---|---|
| 1,251,575 | 12/1960 | France. |
| 671,546 | 5/1952 | Great Britain. |

ISADOR WEIL, *Primary Examiner.*

CLARENCE GORDON, *Examiner.*